United States Patent [19]
Deitrich et al.

[11] Patent Number: 5,735,233
[45] Date of Patent: Apr. 7, 1998

[54] ANIMAL CAGE RACK LOCKING MECHANISM

[75] Inventors: Eric A. Deitrich, Woodbine; John E. Sheaffer, Perryville, both of Md.; Neil E. Campbell, Hasbrouck Heights; James Best, Weehawken, both of N.J.; William Marston, Conowingo; Ronald W. Hardesty, Belair, both of Md.

[73] Assignee: Lab Products, Inc., Seaford, Del.

[21] Appl. No.: 556,156

[22] Filed: Nov. 9, 1995

[51] Int. Cl.⁶ .................................................. A01K 31/00
[52] U.S. Cl. ............................................................. 119/452
[58] Field of Search ........................... 119/452, 453, 119/454, 455, 456, 462, 464, 475

[56] References Cited

U.S. PATENT DOCUMENTS

| 406,964 | 7/1889 | Stedman et al. |
| 415,273 | 11/1889 | Houston. |
| 747,111 | 12/1903 | Abrell. |
| 3,278,205 | 10/1966 | Barlow. |
| 3,386,754 | 6/1968 | Morrison. |
| 3,779,586 | 12/1973 | Rossiter. |
| 3,809,122 | 5/1974 | Berg. |
| 3,966,239 | 6/1976 | Heckenkamp. |
| 4,485,845 | 12/1984 | Brady. |
| 4,622,990 | 11/1986 | Norman. |
| 4,881,569 | 11/1989 | Fournier et al. |
| 5,026,099 | 6/1991 | Hendrix. |
| 5,042,429 | 8/1991 | Deitrich et al. |
| 5,337,696 | 8/1994 | Edstrom et al. |

*Primary Examiner*—Thomas Price
*Attorney, Agent, or Firm*—Stroock & Stroock & Lavan LLP

[57] ABSTRACT

An animal cage rack locking mechanism is provided for releasable locking a cage to an animal cage rack. An indexing arm disposed in a sleeve extends into the slide path of the cage and is coupled to a locking arm also disposed in the sleeve. When the cage is slid into the rack, the indexing arm causes the locking arm to extend from the sleeve to lock the cage in place.

20 Claims, 5 Drawing Sheets

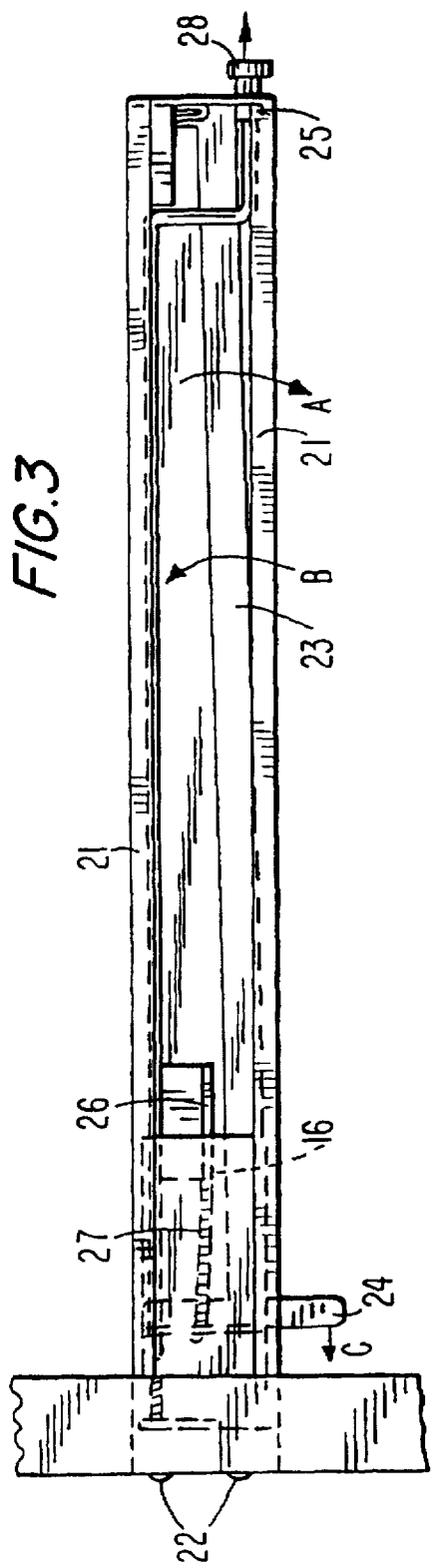
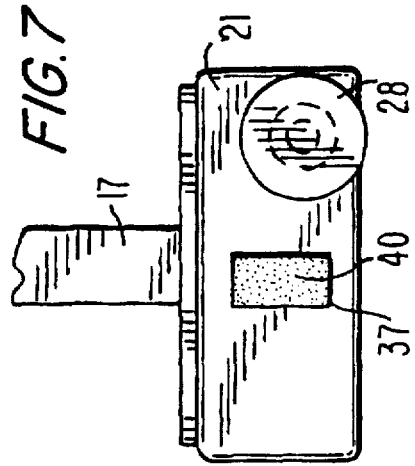
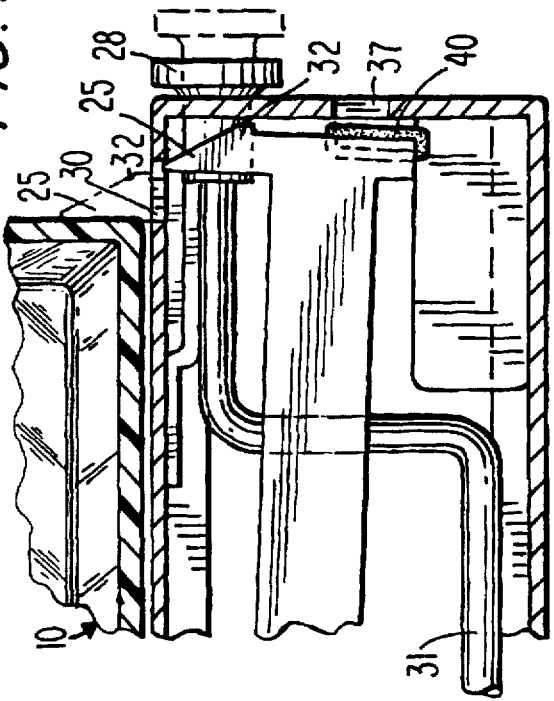

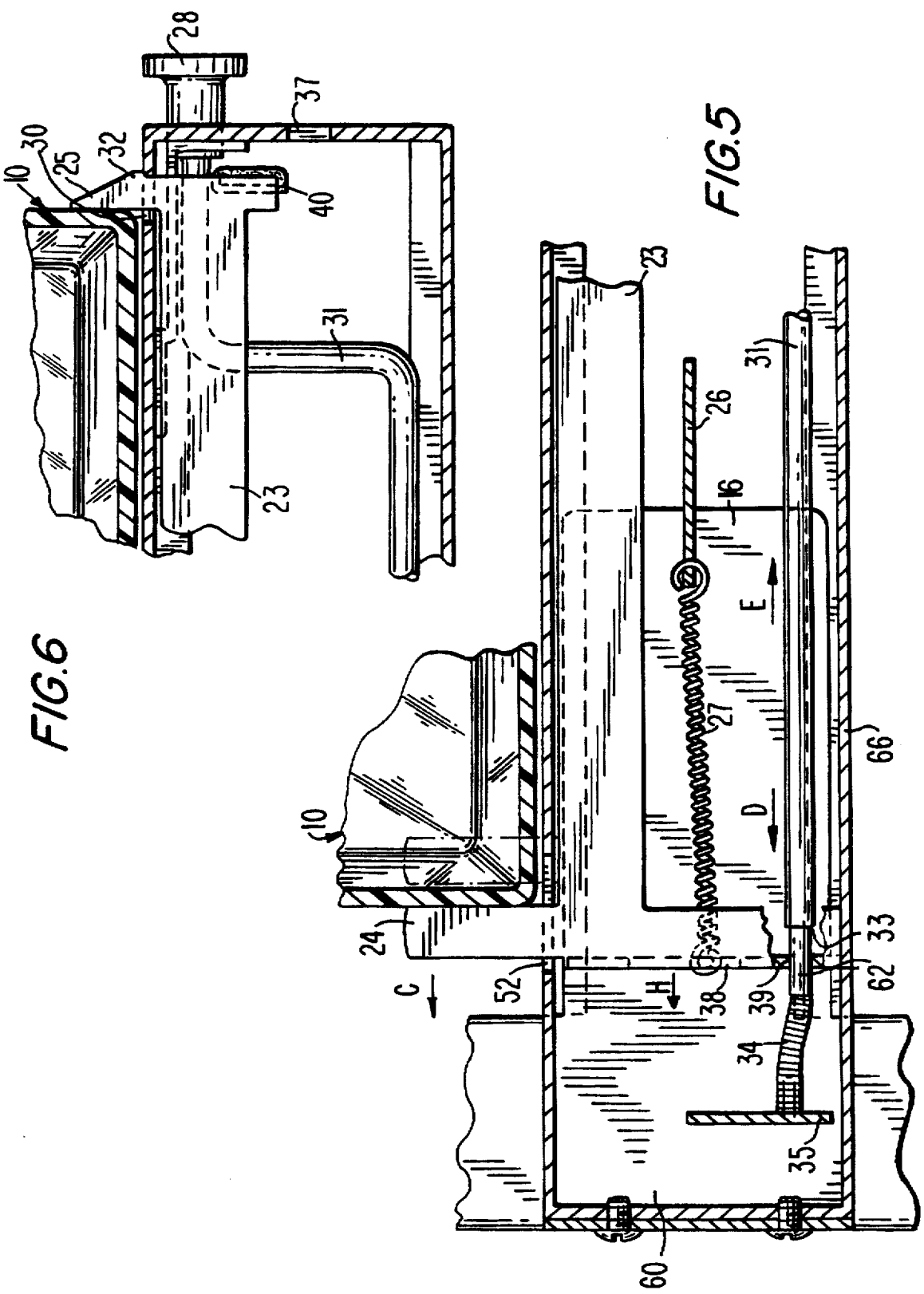

ANIMAL CAGE RACK LOCKING MECHANISM

BACKGROUND OF THE INVENTION

This invention relates generally to a locking mechanism for a cage, and more particularly to a mechanism for releasable securing animal cages within an animal cage rack system.

For laboratory use and other applications, there is a need to house a large number of animals in separate containers in a compact, portable manner. As a result, animal cage rack systems have been developed in which a plurality of animals are housed in separate cages arranged along shelves in a rack. To support the animals, each cage may be supplied with water and/or air through a valve in the cage connected to a common water and/or air plenum on the rack system.

Typically, the cages must be removable from the rack system to provide access to the animals for feeding and testing, and to the cages for cleaning, maintenance and transport. To accommodate this requirement it is known in the art to provide a structure so that the valve in each cage is connected to the air and water plenum by a coupling system. In such a system, each cage is connected to the plenum by pushing the cage into a rack until the coupling at the rear of the cage is connected to the coupling provided on the plenum. The couplings are disengaged by simply pulling the case out of the rack, which closes a valve within the plenum coupling to prevent the escape and contamination of water and air. One such system is disclosed in U.S. Pat. No. 5,042,429.

These prior art animal cage rack systems provide a friction fitting to maintain the connection between the couplings. These couplings have been satisfactory. However, they suffer from the disadvantage that, if the cage is not properly installed in the rack or is accidentally bumped during use, the couplings may become partially or wholly disengaged. In such an event, the water valve may be stuck open, flooding the cage.

Locking mechanisms have been designed to prevent a cage from being accidentally uncoupled from the plenum once the cage is properly installed. Such a prior art mechanism is disclosed for an animal watering system in U.S. Pat. No. 5,337,696. The coupling system between the watering manifold on the rack and the animal cage comprises a first fitting attached to the valve projecting from the cage and a second fitting attached to the source of water and connectable to the first fitting. One of the fittings is a male fitting, and the other fitting is a female fitting, the female fitting having a slidable collar which locks the male fitting to the female fitting. To release the cage from the rack, a decoupler is provided which, when actuated, retracts the collar to unlock the male fitting from the female fitting. The decoupler is remotely provided using a cable or trigger mechanism so the operator need not reach behind the cage to decouple it.

This design suffers from several drawbacks. First, while the design prevents accidental disengagement of the cage subsequent to proper installation, there is no indication that the cage has been properly installed and "locked" in the first instance. Instead, the operator must listen or "feel" for a proper connection and cannot depend on a reliable locking indication. Because the locking mechanism is behind the cage and not observable, the operator cannot positively ascertain whether a cage is locked in position or loose on the shelf. Therefore the system lends itself to not being properly connected which causes flooding. Second, by placing the locking mechanism directly on the coupling system, tensional and torsional forces acting upon the cage caused by accidentally bumping, jarring, or improper cage removal are directed to the coupling system itself. Further, the design depends on several long, relatively thin rigid arms or a long cable, mounted directly to the rack system itself, to transfer operability from the locking collar in the rear of the cage to the front of the cage. When the cable or arm fails it is difficult to unlock the cage because the cage is locked in place behind the cage making the lock fairly inaccessible for disconnecting.

Accordingly, it is desired to provide a simple, self-contained animal cage rack locking mechanism which enables an operator to lock a cage to a rack to maintain engagement of the coupling system despite bumping, jarring or improper removal of the cage, and which further enables an operator to visually determine whether a cage has been properly installed within the rack and which allows the operator to remotely unlock the cage from the rack.

SUMMARY OF THE INVENTION

An animal cage rack locking mechanism is provided for releasable locking a cage to an animal cage rack system. An indexing arm disposed in a sleeve extends into the slide path of the cage and is coupled to a locking arm also disposed in the sleeve. When the cage is slid into the rack system, the indexing arm causes the locking arm to extend from the sleeve to lock the cage in place.

Accordingly, it is an object of this invention to provide an improved animal cage rack locking mechanism.

Another object of this invention is to provide a cage rack locking mechanism which reliably locks an animal cage in an animal cage rack.

A further object of this invention is to provide an animal cage rack locking mechanism which maintains engagement of the coupling system between the cage and a water and/or air plenum on the rack system despite accidental jarring, bumping, improper removal of the cage or the like.

A still further object of this invention is to provide an animal cage rack locking mechanism which allows an operator to quickly unlock and release a cage from an animal cage rack from the front of the cage or rack.

Yet another object of this invention is to provide an animal cage rack locking mechanism with a visual indicator at the front of the rack denoting whether the cage is properly locked in position or is unlocked.

Still other objects and advantages of the invention will in part be obvious and will in part be apparent from the specifications and drawings.

The invention accordingly comprises the features of construction, combination of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 3 is a bottom plan view of the animal cage rack locking mechanism in an unlocked state;

FIG. 4 is a sectional view taken along the line 4—4 of FIG. 1 depicting the animal cage rack locking mechanism in an unlocked state;

FIG. 5 is a sectional view taken along the line 5—5 of FIG. 1 depicting the animal cage rack locking mechanism in an unlocked state;

FIG. 6 is a sectional view taken along line 4—4 of FIG. 1 depicting the animal cage rack locking mechanism in a locked state;

FIG. 7 is a front elevation view of the animal cage rack locking mechanism;

DETAILED DESCRIPTION OF THE PREFERRED EMBODIMENTS

Figure 1:
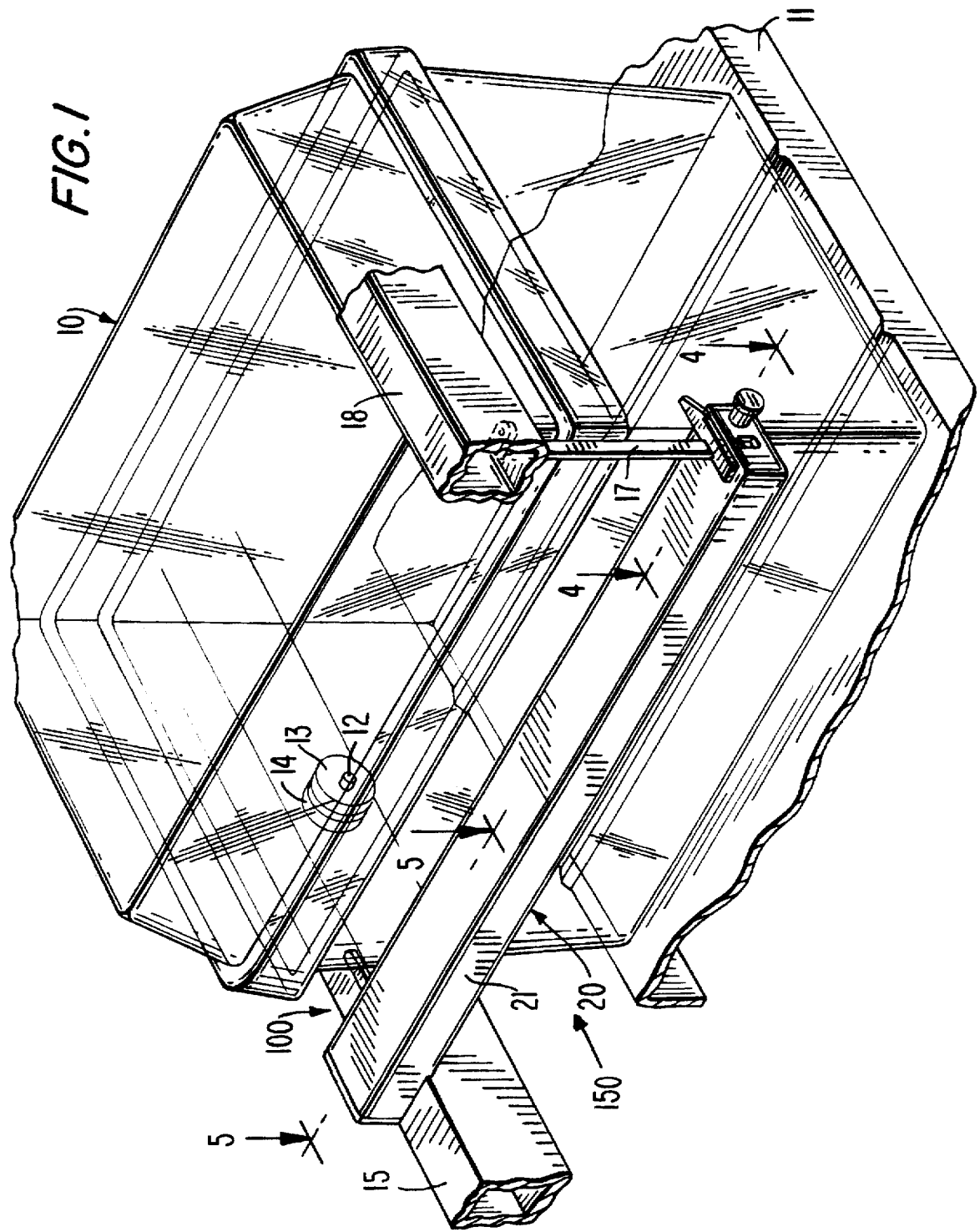
FIG. 1 is a perspective view of an animal cage rack locking mechanism constructed in accordance with the present invention, locking an animal cage within an animal cage rack.
Figure 2:
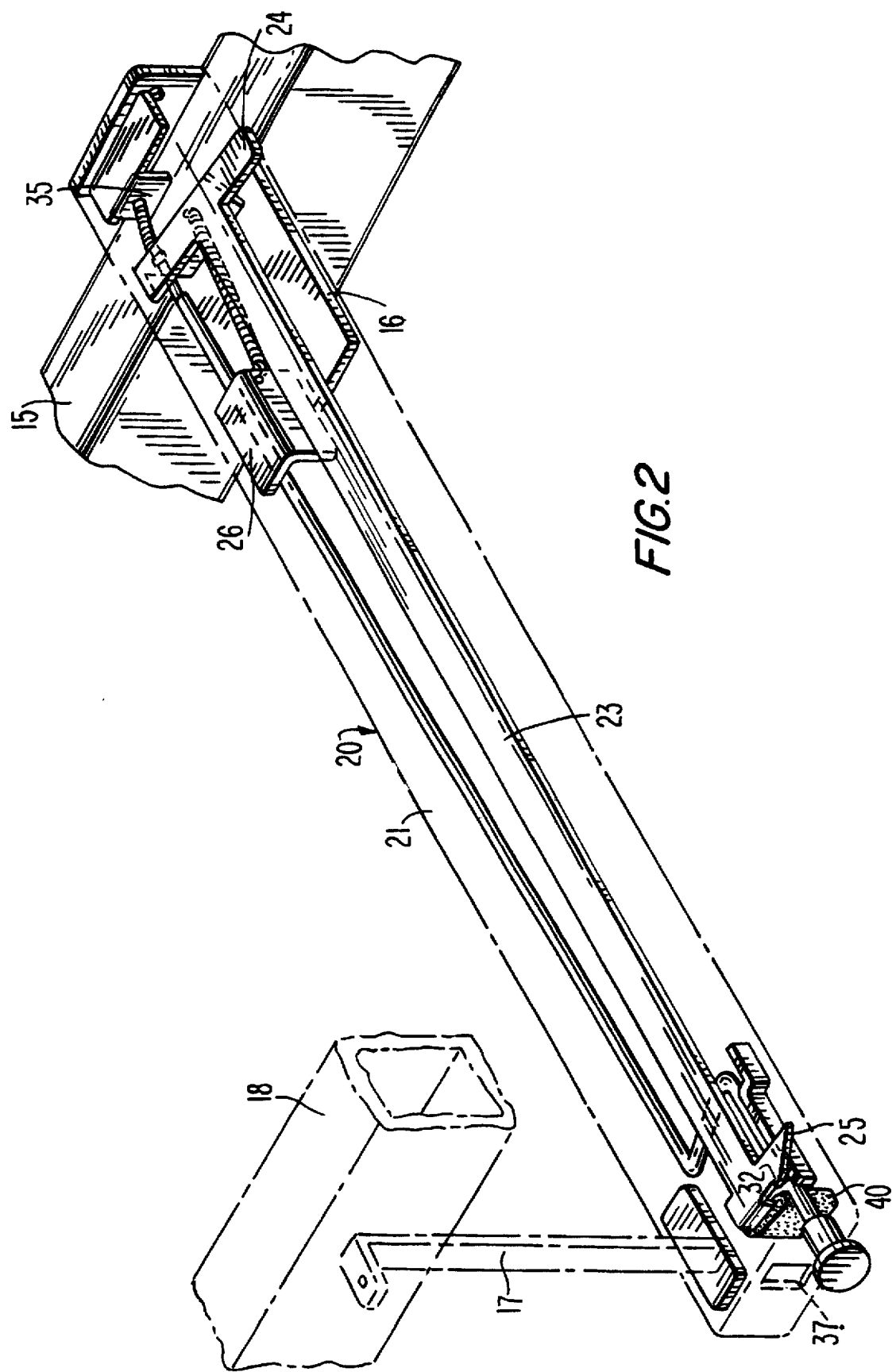
FIG. 2 is a perspective view of the animal cage rack locking mechanism with the sleeve shown in phantom.

As shown in FIGS. 1 and 2, an animal cage rack system 150 includes a rack 100 which includes shelf 11, an animal cage 10 removably mounted on rack 100, both known from the animal cage rack system of U.S. Pat. No. 5,042,429 and incorporated as if set forth fully herein, and a locking mechanism 20 for securing cage 10 within the rack 100. Cage 10 rests on shelf 11. Cage 10 is fitted with an animal watering and/or ventilation valve 12 which projects through the rear wall of cage 10 and terminates at a cage coupling 13 as is known in the art.

Rack 100 includes a plenum 15 for supplying water and air throughout the rack system. A plenum coupling 14 mounted on plenum 15 releasably engages cage coupling 13 to provide water and/or air to animals within cage 10 through the connection of detachable couplings 13 and 14. Preferably, the coupling between plenum 15 and cage 10 comprises a quick-disconnect mechanism. A rack guide 16 extends from plenum 15 and guides cage 10 into position on shelf 11 as cage 10 is slid along shelf 11 into position to allow coupling of cage coupling 13 and plenum coupling 14.

As shown in FIGS. 1–5, locking mechanism 20 includes a sleeve 21. Sleeve 21 is formed with a first side slot 52 and a second side slot 30. An anchor 26 is mounted on a panel 60 of sleeve 21. A base 35 is mounted on panel 60 of sleeve 21.

A pivoting member 23 which extends substantially the length of cage 10 is pivotally disposed within sleeve 21. An indexing arm 24 is formed at one end of pivoting member 23 and extends through slot 52 of sleeve 21 and into the slide path of cage 10. A locking arm 25 is provided at the opposite end of pivoting member 23 and selectively extends through slot 30 in sleeve 21 when pivoting member 23 is pivoted. A vertically disposed flange 38 extends from a portion of indexing arm 24. A biasing spring 27 couples flange 38 to anchor 26 and biases pivoting member 23 in the direction of arrow A (FIG. 3). Anchor 26 is mounted between indexing arm 24 and locking arm 25 on the side of pivoting member 23 opposite cage 10 so that biasing spring 27 biases pivoting member 23 to pivot so that indexing arm 24 extends through slot 52 and locking arm 25 does not extend through slot 30. Furthermore, spring 27 and anchor 26 provide a pivot point so that when indexing arm 24 is pushed in the direction of arrow C locking arm 25 moves to extend through slot 30 as shown in FIGS. 5 and 6.

Figure 8:
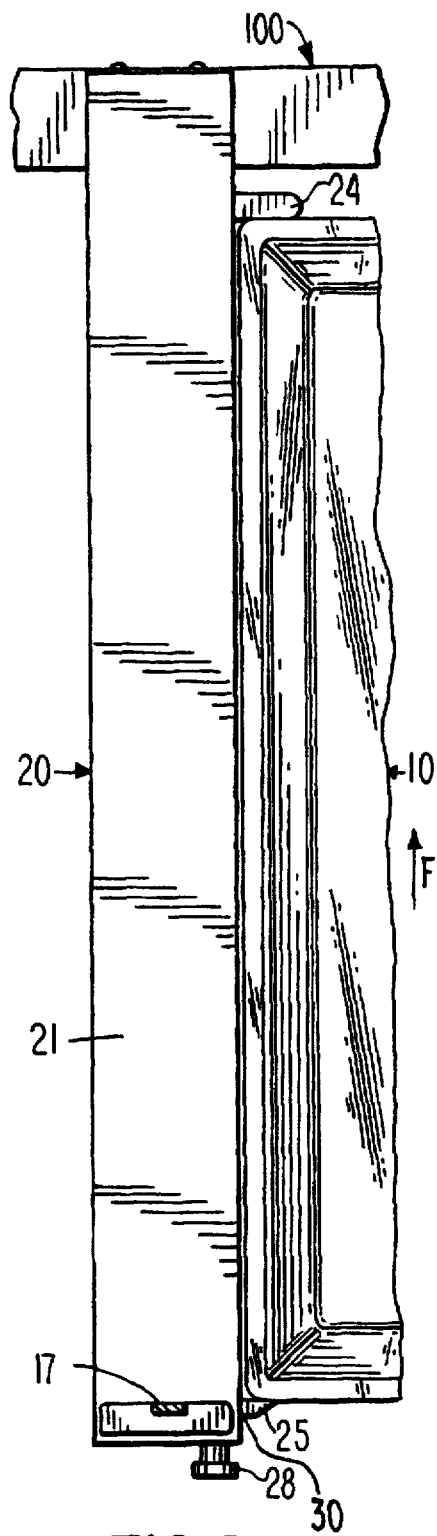
FIG. 8 is a top plan view of the animal cage rack locking mechanism illustrating an animal cage locked in place on a rack.

As shown in FIG. 8, because pivoting member 23 is substantially the length of cage 10, when the cage is slid its length along a slide path within the rack, it pushes indexing arm 24 in the direction of arrow C (FIG. 3), causing pivoting member 23 to pivot in a direction which causes locking arm 25 to extend through slot 30 in sleeve 21. When the full length of cage has passed slot 30, locking arm 25 extends through slot 30 engaging cage 10 in place between indexing arm 24 and locking arm 25. Indexing arm 24 is positioned at a distance from plenum coupling 14 corresponding to a position in which the entire length of cage 10 has passed slot 30 and cage coupling 13 has coupled with plenum coupling 14, holding cage 10 in a position in which detachable couplings 13 and 14 of FIG. 1 are properly engaged, thereby reliably supplying water and air to valve 12. Preferably, locking arm 25 is provided with an engaging lip 32 such that when locking arm 25 is extended through slot 30 of sleeve 21, engaging lip 32 extends along sleeve 21 beyond slot 30 to engage sleeve 21 and prevent locking arm 25 from inadvertently retracting within sleeve 21.

Locking mechanism 20 also includes a release mechanism. As shown in FIGS. 4 and 5, a releasing member 31 is slidably disposed in sleeve 21 and extends through sleeve 21 to provide access to an operator. A release button 28 is mounted on releasing member 31 such that release button 28 extends beyond sleeve 21. The opposed end of releasing member 31 extends through a hole 39 in flange 38. A return spring 34 couples base 35 and releasing member 31. A distal end 62 of releasing member 31 has a smaller diameter than the remainder of releasing member 31 forming a collar 33. Collar 33 is too large to pass through hole 39 so that movement of releasing member 31 in the direction of arrow D moves flange 38. Hole 39 is disposed along flange 38 between anchor 26 and panel 66 of sleeve 21, preferably as far as possible from anchor 26 to improve leverage. Spring 34 biases releasing member 31 in the direction of arrow E. To release cage 10, releasing member 31 is pushed in the direction of arrow D, moving flange 38 and pivoting member 23 causing pivoting member 23 to rotate in the direction of arrow B (FIG. 3) causing locking arm 25 to slide within sleeve 21. Spring 34 then returns releasing member 31 to a non-releasing position.

Reference is now made to FIGS. 4 and 7, wherein an indicator is described. An indicator window 37 is provided in a user-viewable end of sleeve 21. An indicator tab 40 depends vertically from locking arm 25 and moves with locking arm 25 so that when locking arm 25 is not extended from sleeve 21, indicator tab 40 is viewable through indicator window 37, thereby warning an operator that the cage is unlocked. When locking arm 25 extends from sleeve 21, cage 10 is locked in place and the front end of pivoting member 23 pivots towards cage 10 which moves indicator tab 40 out of the view of indicator window 37, thereby indicating that cage 10 is properly locked in place. Indicator tab 40 is preferably painted or covered with a rubberized boot of a bright color to improve visibility of the indicator. Thus, by simply looking at locking mechanism 20, an operator may determine whether a particular cage is properly locked in the rack. Further, by merely scanning the front of an entire rack system for a brightly colored indicator, an operator may determine at a glance whether any of the cages are not properly engaged and may quickly rectify the problem.

As shown in FIGS. 1–3, locking mechanism 20 includes a sleeve 21 which is slidably mounted on a rack guide 16, of the type typically provided in conventional rack systems to align the sides of a cage within a rack, to allow retrofitting of a locking mechanism onto a rack system. In a preferred embodiment, sleeve 21 has an end which substantially abuts the rear of rack 100 and is secured to rack 100 with screws 22. A brace 17 stabilizes the opposed end of locking mechanism 20. A first end of brace 17 is attached to an end of sleeve 21, and a second end of brace 17 is attached to a shelf 11 of the rack above cage 10 or to a support 18 for the rack above cage 10 or for the top of the rack system. Preferably, brace 17 is welded to or formed integrally with sleeve 21 and is preferably secured to support 18 or shelf 11 above cage 10 with screws. It is understood that sleeve 21 is used by way of example as one structure to allow retrofitting of a locking mechanism and that other mounting methods are possible including but not limited to integrally forming locking mechanism 20 as part of rack 100 without need for sleeve 21.

Figure 9:
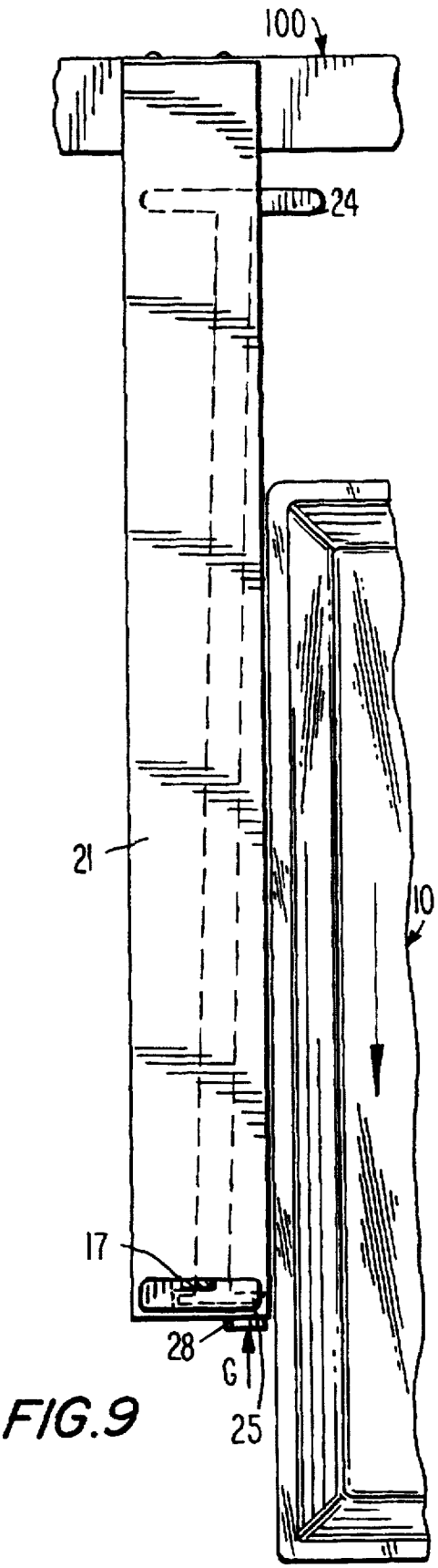
FIG. 9 is a top plan view of the animal cage rack locking mechanism illustrating the operation of unlocking an animal cage from a rack.

Reference is now also made to FIGS. 8 and 9 wherein the operation of cage locking mechanism 20 is depicted. To lock a cage 10 in place on a shelf 11 within a rack 100, cage 10 is slid in the direction of arrow F until it contacts indexing arm 24. As cage 10 continues movement in the direction of arrow F, indexing arm 24 moves in the direction of arrow C (FIG. 5). As indexing arm 24 moves in the direction of arrow C, pivoting member 23 pivots in the direction of arrow A (FIG. 3). Because the distance between locking arm 25 and indexing arm 24 is substantially equal to the length of the cage 10, once cage 10 has entirely passed slot 30 in the direction of arrow F, locking arm 25 fully extends from slot 30 to anchor cage 10 in place between indexing arm 24 and locking arm 25. In effect, indexing arm 24 acts to index the length of cage 10 because as indexing arm 24 sufficiently moves in the direction of arrow C, cage 10 is locked in place. Because indexing arm 24 is positioned so that it is fully pushed in the direction of arrow C when cage 10 has been slid into position along its slide path to couple coupling 13 with coupling 14, it causes locking to occur when coupling has occurred. As locking arm 25 moves into the locking position as shown in FIG. 8, indicator tab 40 is no longer visible through indicator window 37 indicating to a user that the cage is in fact locked in the proper position.

Cage 10 is released from locking mechanism 20 in the following manner. An operator depresses release button 28 in the direction of arrow G (FIG. 9) which forces releasing member 31 into sleeve 21. Collar 33 of releasing member 31 pushes flange 38 in the direction of arrow H (FIG. 5). Pivoting member 23, biased by biasing spring 27, pivots in the direction of arrow B and retracts locking arm 25 within sleeve 21 through slot 30. Release button 28 is then extended to its original position by return spring 34. In this arrangement, cage 10 may be freely removed from the rack as shown in FIG. 9.

By utilizing a pivoting member mounted along the length of the cage, the locking mechanism itself is moved completely away from the coupling system. Any forces acting on the cage to disengage it from the rack are transmitted to the locking and indexing arms of locking mechanism 20 instead of to the relatively weak coupling between couplings 13 and 14 which must remain properly aligned to facilitate engagement and disengagement. Further, by arranging all parts of the locking mechanism within sleeve 21, the animal cage rack locking mechanism may be manufactured independently of the rack system itself and may be retrofitted on rack systems which currently do not provide the locking system. The self-contained design also allows the locking mechanism to be removed for ease of maintenance, even while the cage remains coupled to the rack system. It is also understood that the locking mechanism herein described may also be utilized in rack systems which do not provide a water or air plenum.

Furthermore, by removing the locking mechanism from the coupling, an operator may thus quickly unlock a cage from the rack without reaching behind the cage to disengage the coupling system itself. In addition, as noted above in conjunction with the locking mechanism, the release mechanism of the present invention operates independently of the coupling system which therefore reduces stress and strain on couplings 13 and 14. Moreover, the release mechanism here described in the sleeve embodiment is contained wholly within animal cage rack locking mechanism 20, so none of the parts of the release mechanism need be mounted directly to the rack system. Therefore, no consideration need be given to providing an adequate clearance behind the cage for the levers or pulleys necessary to disengage the coupling system as provided in prior art designs. By utilizing an indexing arm the locking mechanism utilizes a sensor behind the cage to activate a locking mechanism in front of the cage.

It will thus be seen that the objects set forth above, among those made apparent from the preceding description, are efficiently attained and, since certain changes may be made in the above construction without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. An animal cage rack locking mechanism for releasable locking a cage to a rack comprising:

a sleeve;

an indexing arm disposed in the sleeve and adapted to extend into a slide path of the cage within the rack;

a locking arm disposed in the sleeve and operatively coupled to the indexing arm, the indexing arm causing the locking arm to extend from the sleeve as the cage moves along the cage slide path to lock the cage in the rack; and a pivoting member pivotably disposed within the sleeve, the pivoting member having a first end and a second end, the indexing arm being formed at the first end of the pivoting member, and the locking arm being formed at the second end of the pivoting member.

2. The animal cage rack locking mechanism of claim 1, wherein the pivoting member is substantially the length of the cage.

3. The animal cage rack locking mechanism of claim 1, further comprising an anchor mounted in the sleeve and a spring coupling the anchor to the pivoting member which pivots the pivoting member within the sleeve.

4. The animal cage rack locking mechanism of claim 1, further comprising a release mechanism for retracting the locking arm within the sleeve.

5. The animal cage rack locking mechanism of claim 4, wherein the mechanism includes a releasing member operatively coupled to the indexing arm, the releasing member causing the pivoting member to pivot.

6. The animal cage rack locking mechanism of claim 5, wherein the releasing member is disposed on said sleeve so as not to be blocked by the cage when the cage is locked in the rack.

7. The animal cage rack locking mechanism of claim 1, further comprising a visual indicator disposed on sleeve for indicating whether the animal cage rack locking mechanism is in one of a locked and an unlocked state.

8. The animal cage rack locking mechanism of claim 7, further comprising an indicator window disposed in the sleeve for viewing the visual indicator.

9. The animal cage rack locking mechanism of claim 8, further comprising an indicator tab mounted on the locking arm, the tab moving with the locking arm between a first position and a second position, the tab being viewable through the indicator window when the locking arm is in the first position and not being viewable when the locking arm is in the second position.

10. An animal cage rack locking mechanism for releasable locking a cage to a rack comprising:

a sleeve;

a pivoting member pivotably disposed within the sleeve and having a first end and a second end;

an indexing arm disposed on the first end of the pivoting member and extending into the slide path of the cage within the rack;

a locking arm disposed on the second end of the pivoting member, the indexing arm causing the locking arm to extend from the sleeve as a cage moves along the cage slide path to lock the cage in the rack;

a releasing mechanism for retracting the locking arm within the sleeve, said releasing mechanism including a releasing member operatively coupled to the indexing arm, the releasing member causing the pivoting member to pivot; and a visual indicator for indicating whether the animal cage rack locking mechanism is in one of a locked and an unlocked state.

11. An animal cage rack locking mechanism for releasable locking a cage to a rack comprising:

an indexing arm disposed in the rack and adapted to extend into a slide path of the care on the rack;

a locking arm disposed in the rack and operatively coupled to the indexing arm, the indexing arm causing the locking arm to extend from the rack as the cage moves along the cage slide path to lock the cage in the rack; and a pivoting member pivotably disposed within the rack, the pivoting member having a first end and a second end, the indexing arm being formed at the first end of the pivoting member, and the locking arm being formed at the second end of the pivoting member.

12. The animal cage rack locking mechanism of claim 11, wherein the pivoting member is substantially the length of the cage.

13. The animal cage rack locking mechanism of claim 11, further comprising an anchor mounted on the rack and a spring coupling the anchor to the pivoting member which pivots the pivoting member within the rack.

14. The animal cage rack locking mechanism of claim 11, further comprising a release mechanism operatively coupled to said indexing arm for retracting the locking arm within the rack.

15. The animal cage rack locking mechanism of claim 14, wherein the releasing mechanism includes a releasing member coupled to the indexing arm, the releasing member causing the pivoting member to pivot.

16. The animal cage rack locking mechanism of claim 15, wherein the releasing member is disposed in the rack so as not to be blocked by the cage when the cage is locked in the rack.

17. The animal cage rack locking mechanism of claim 11, further comprising a visual indicator disposed on said sleeve for indicating whether the animal cage rack locking mechanism is in one of a locked and an unlocked state.

18. The animal cage rack locking mechanism of claim 17, further comprising an indicator window disposed on the rack for viewing the visual indicator.

19. The animal cage rack locking mechanism of claim 18, further comprising an indicator tab mounted on the locking arm, the tab moving with the locking arm between a first position and a second position, the tab being viewable through the indicator window when the locking arm is in the first position and not being viewable when the locking arm is in the second position.

20. An animal cage rack locking mechanism for releasable locking a cage to a rack system comprising:

a pivoting member pivotably disposed within the rack and having a first end and a second end;

an indexing arm disposed on the first end of the pivoting member and extending into a slide path of the cage within the rack;

a locking arm disposed on the second end of the pivoting member, the indexing arm causing the locking arm to extend from the rack as the cage moves along the cage slide path to lock the cage in the rack;

a releasing mechanism for retracting the locking arm within the rack, said releasing mechanism including a releasing member operatively coupled to the indexing arm, the releasing member causing the pivoting member to pivot; and a visual indicator for indicating whether the animal cage rack locking mechanism is in one of a locked and an unlocked state.

* * * * *